US006895229B2

United States Patent
Schetelig et al.

(10) Patent No.: US 6,895,229 B2
(45) Date of Patent: May 17, 2005

(54) RECEIVER ARRANGEMENT FOR RECEIVING FREQUENCY-MODULATED RADIO SIGNALS AND METHODS OF ADAPTING AND TESTING A RECEIVING BRANCH OF THE RECEIVER ARRANGEMENT

(75) Inventors: Markus Schetelig, Essen (DE); Paul Burgess, Bochum (DE); Arno Kefenbaum, Hattingen (DE)

(73) Assignee: Nokia Mobile Phones Ltd., Espoo (FI)

( * ) Notice: Subject to any disclaimer, the term of this patent is extended or adjusted under 35 U.S.C. 154(b) by 759 days.

(21) Appl. No.: 09/832,113

(22) Filed: Apr. 10, 2001

(65) Prior Publication Data

US 2001/0046845 A1 Nov. 29, 2001

(30) Foreign Application Priority Data

Apr. 11, 2000 (DE) .......................................... 100 18 021

(51) Int. Cl.[7] .............................................. H04B 17/00
(52) U.S. Cl. ...................... 455/226.1; 455/425; 455/265
(58) Field of Search .......................... 455/226.1, 226.4, 455/425, 255–260, 265; 375/373, 375, 376

(56) References Cited

U.S. PATENT DOCUMENTS

| | | | |
|---|---|---|---|
| 3,605,022 A | 9/1971 | De Fillipo et al. .......... 325/363 |
| 5,678,169 A | 10/1997 | Turney ........................... 455/1 |
| 5,835,850 A | 11/1998 | Kumar ....................... 455/67.4 |
| 5,881,376 A | 3/1999 | Lundberg et al. ........ 455/226.1 |
| 6,259,314 B1 * | 7/2001 | Liu et al. ..................... 329/304 |

OTHER PUBLICATIONS

English Abstract of Japanese Patent document No. JP 10276232.

* cited by examiner

*Primary Examiner*—Lee Nguyen
(74) *Attorney, Agent, or Firm*—Perman & Green, LLP.

(57) ABSTRACT

The invention relates to a receiver arrangement for receiving frequency-modulated radio signals, having a demodulator circuit arrangement (18), which converts and intermediate-frequency signal into a voltage signal, which is applied to an input stage (22) of a signal-processing circuit arrangement (23), and having a clock-signal oscillator (26), which supplies a clock signal for generating a frequency signal for reducing the frequency of a received signal to the intermediate frequency, and relates to a method of adapting a receiving branch of the receiver arrangement to an input stage (22) of a signal-processing circuit arrangement (23) and a self-testing method. To allow the adaptation of the demodulator circuit arrangement to the downstream input stage of a signal-processing circuit arrangement to be carried out without external test signals, a test-signal generator stage (28) is provided, which forms a test signal with a known frequency from the clock signal supplied by the clock-signal oscillator (26).

14 Claims, 3 Drawing Sheets

RECEIVER ARRANGEMENT FOR RECEIVING FREQUENCY-MODULATED RADIO SIGNALS AND METHODS OF ADAPTING AND TESTING A RECEIVING BRANCH OF THE RECEIVER ARRANGEMENT

DESCRIPTION

1. Field of the Invention

The invention relates to a receiver arrangement for receiving frequency-modulated radio signals and relates to a method of adapting a receiving branch of the receiver arrangement to an input stage of a signal-processing circuit arrangement and a self-testing method for the receiving branch.

2. Brief Description of Related Developments

Receiver arrangements for receiving frequency-modulated radio signals usually have in their receiving branch an input circuit in which the carrier frequency of the received and amplified antenna signal is reduced to a fixed intermediate frequency, which is independent of the received carrier frequency. The intermediate-frequency signal is then fed to a demodulator circuit arrangement, which has a demodulator circuit which converts the intermediate-frequency signal into a voltage signal. The demodulator circuit uses for this an oscillating circuit, which is tuned to the intermediate frequency, in order to register the phase shift of the frequency-modulated intermediate-frequency signal and derive from it a corresponding voltage signal.

If the natural frequency of the oscillating circuit deviates from the intermediate frequency as a result of production tolerances, temperature influences and/or ageing, or if the intermediate frequency fluctuates as a result of tolerances, temperature drifts and ageing effects of a clock-signal oscillator, the output voltage of the demodulator circuit is shifted by a direct voltage component. Since an A/D converter, serving as an input stage of a downstream processing circuit arrangement, has only a restricted dynamic range, and consequently only a restricted input voltage range, corresponding compensation of the undesired direct voltage component in the output signal of the demodulator circuit is required. Used for this purpose is an offset stage, which compensates for the direct voltage offset as a result of the deviation of the natural frequency of the oscillating circuit from the intermediate frequency by adding or subtracting a corresponding direct voltage to or from the output signal of the demodulator circuit.

To set the offset stage for adapting the output signal of the demodulator circuit arrangement to the input voltage range of the input stage of the downstream signal-processing circuit arrangement, in a receiver arrangement designed for burst reception the first bits of a burst, which serve for synchronization, can be used as test signals for a setting range, without any loss of data occurring.

If, however, the individual bursts have only a few start bits, which signal the beginning of a burst, as is the case with the Bluetooth standard, an adaptation of the demodulator circuit arrangement to the signal-processing circuit arrangement is not possible in this known way.

Against this background, the invention is based on the object of providing a receiver arrangement for receiving frequency-modulated radio signals in which the adaptation of a demodulator circuit arrangement to the input stage of a downstream signal-processing circuit arrangement can be carried out without external test signals. A further object of the invention is to provide methods of adapting a receiving branch of a receiver arrangement to an input stage of the signal-processing circuit arrangement and a self-testing method for the receiving branch.

This object is achieved by the receiver arrangement according to claim 1 and by the methods according to claims 10 and 14.

SUMMARY OF THE INVENTION

Thus, in the case of a receiver arrangement for receiving frequency-modulated radio signals which has a demodulator circuit arrangement for converting an intermediate-frequency signal into a voltage signal, which is applied to an input stage of a signal-processing circuit arrangement, and has a clock-signal oscillator, which supplies a clock signal for the clock control of elements of the circuit arrangement, the invention provides a test-signal generator stage, the input of which is connected to an output of the clock-signal oscillator supplying the clock signal and the output of which is connected to an input stage of the demodulator circuit arrangement, with a control circuit arrangement for setting and/or testing the demodulator circuit arrangement controlling the test-signal generator stage for carrying out setting or testing operation and, during the setting or testing operation, setting the demodulator circuit arrangement on the basis of its output signal or supplying a test-result signal indicating serviceability.

In particular, for adapting a receiving branch comprising the demodulator circuit arrangement to the input stage of the signal-processing circuit arrangement, initially a test signal with a known frequency can be formed from a clock signal supplied by the clock-signal oscillator and can be applied to an input of the demodulator stage, in order subsequently to set the demodulator circuit arrangement on the basis of its output signal in such a way that its output signal is adapted to the input stage of the signal-processing circuit arrangement.

In addition, for testing the receiving branch of the receiver arrangement, a self-testing method can also be carried out, in which a test signal with a known frequency is formed from a clock signal supplied by the clock-signal generator and is applied to an input of the demodulator circuit arrangement, and in which a test-result signal indicating the serviceability of the receiving branch is generated on the basis of the output signal of the said receiving branch.

The present invention thus makes it possible without external signals to check the serviceability of a receiver arrangement and also to adapt the receiving branch to the downstream signal-processing circuit arrangement, a clock signal of an oscillator that is present in any case in the receiver arrangement being used for generating the test signal.

It is particularly expedient if the test-signal generator stage is connected to the clock-signal oscillator, the clock signal of which serves for generating a frequency signal for reducing the frequency of a received signal to the intermediate frequency, since this involves deriving the test signal from the same clock-signal oscillator as the frequency signal for reducing the frequency of the received signal to the intermediate frequency, and consequently flutuations of the clock signal are virtually of no significance for the setting of the demodulator circuit arrangement, because flutuations of this type also bring about corresponding tolerances of the intermediate frequency.

If the frequency of the clock-signal oscillator is in a suitable ratio in relation to the intermediate frequency, it is conceivable to provide as the test-signal generator stage simply a switch which can be actuated by the control circuit arrangement and by means of which the clock signal is applied directly to the input of the demodulator circuit arrangement. In an advantageous configuration of the invention, however, it is provided that the test-signal generator stage comprises a frequency divider, which supplies as the output signal a frequency signal which contains a harmonic with a first frequency equal or virtually equal to the intermediate frequency. The frequency signal is in this case a non-sinusoidal signal, in particular a square-wave signal.

To improve the accuracy of the setting of the demodulator circuit arrangement further, it is provided in a development of the invention that the test-signal generator stage has a further frequency divider, the frequency divider ratio of which is different from that of the first frequency divider and the output signal of which is applied to a mixer, to which the output signal of the first frequency divider is also fed in order to obtain a test signal which contains a different harmonic with a second frequency close to the intermediate frequency, with the clock signal output of the clock-signal oscillator being applied to the frequency dividers via in each case one of the switches which can be controlled by the control circuit arrangement.

It is particularly advantageous if the demodulator circuit arrangement has as the input stage a bandpass filter, and if the fundamental frequency of the test signal is greater than the bandwidth of the bandpass filter, preferably greater than twice the bandwidth, in particular greater than four times the bandwidth of the bandpass filter.

An expedient configuration of the invention is distinguished by the fact that the demodulator circuit arrangement has as the output stage an offset stage, which is connected to a voltage signal output of a demodulator circuit of the demodulator circuit arrangement in order to adapt the output signal of the demodulator circuit arrangement to the input stage of the signal-processing circuit arrangement, the offset stage adding a direct voltage component to the voltage signal supplied by the demodulator circuit. To make setting operation as simple as possible, it is provided that the offset stage is set by the control circuit arrangement during setting operation on the basis of its output signal.

A particularly preferred embodiment of the invention is distinguished by the fact that the control circuit arrangement is assigned a memory in which a value for a direct voltage offset to be set, determined during the setting operation on the basis of the output signal of the offset stage, is stored, and that the offset stage can be set by the control circuit arrangement to correspond to the stored value. This makes it possible during a receiving period to set the setting of the demodulator circuit arrangement before each burst on the basis of a setting value determined at the beginning of the receiving period. This consequently makes it possible to avoid the determination of a setting value for the demodulator circuit arrangement before every burst, which has the consequence of reducing the energy consumption of the receiver arrangement without impairing the receiving quality, since there is virtually no risk of frequency drifts in the demodulator circuit arrangement during a receiving period.

When carrying out the method according to the invention of adapting the receiving branch to the input stage of the signal-processing circuit arrangement, it is expediently provided that the test signal is formed from the clock signal supplied by the clock-signal oscillator by frequency division with wave shaping, in particular with square-wave shaping, so that the test signal contains a harmonic with a first frequency equal or virtually equal to the intermediate frequency and the harmonic with the first frequency is fed to a demodulator circuit of the demodulator circuit arrangement via a filter, preferably via a bandpass filter.

In an advantageous configuration of the method according to the invention, it is provided that a second test signal is generated by mixing the first test signal with a signal formed from the clock signal supplied by the clock-signal oscillator by frequency division by a different divider factor, the frequency of which signal is equal or virtually equal to twice the difference between the frequency of the harmonic with the first frequency and the intermediate frequency, so that the second test signal contains a harmonic with a second frequency virtually equal to the intermediate frequency.

In this case it is particularly advantageous if the first test signal and the second test signal are applied one after the other to the demodulator circuit arrangement, in order to determine a direct voltage offset for the adaptation of the output signal of the demodulator circuit arrangement to the input stage of the signal-processing circuit arrangement.

In the self-testing method as well, the test signal is preferably formed from the clock signal supplied by the clock-signal oscillator by frequency division with square-wave shaping, so that the test signal contains a harmonic with the first frequency equal or virtually equal to the intermediate frequency.

The present invention thus allows the use of a relatively slow clock signal for testing and setting a demodulator circuit arrangement which operates with a relatively high frequency, without complex circuit arrangements having to be used for generating a high frequency from a low clock frequency, in that a harmonic present in a square-wave signal is simply filtered out from the square-wave signal and used as the actual test signal.

By combining the first square-wave signal with a second signal, the frequency of which was derived from the clock signal by frequency division by a much higher dividing factor, a second test signal can be generated, so that two measurements can be carried out for the setting, it being possible to determine from these two measurements a more accurate setting value.

BRIEF DESCRIPTION OF THE DRAWINGS.

The invention is explained in more detail below by way of example with reference to the drawing, in which.

In the various figures of the drawing, elements of the circuit arrangements corresponding to one another are provided with the same reference numerals.

DETAILED DESCRIPTION OF THE PREFERRED EMBODIMENT(S)

Figure 1:
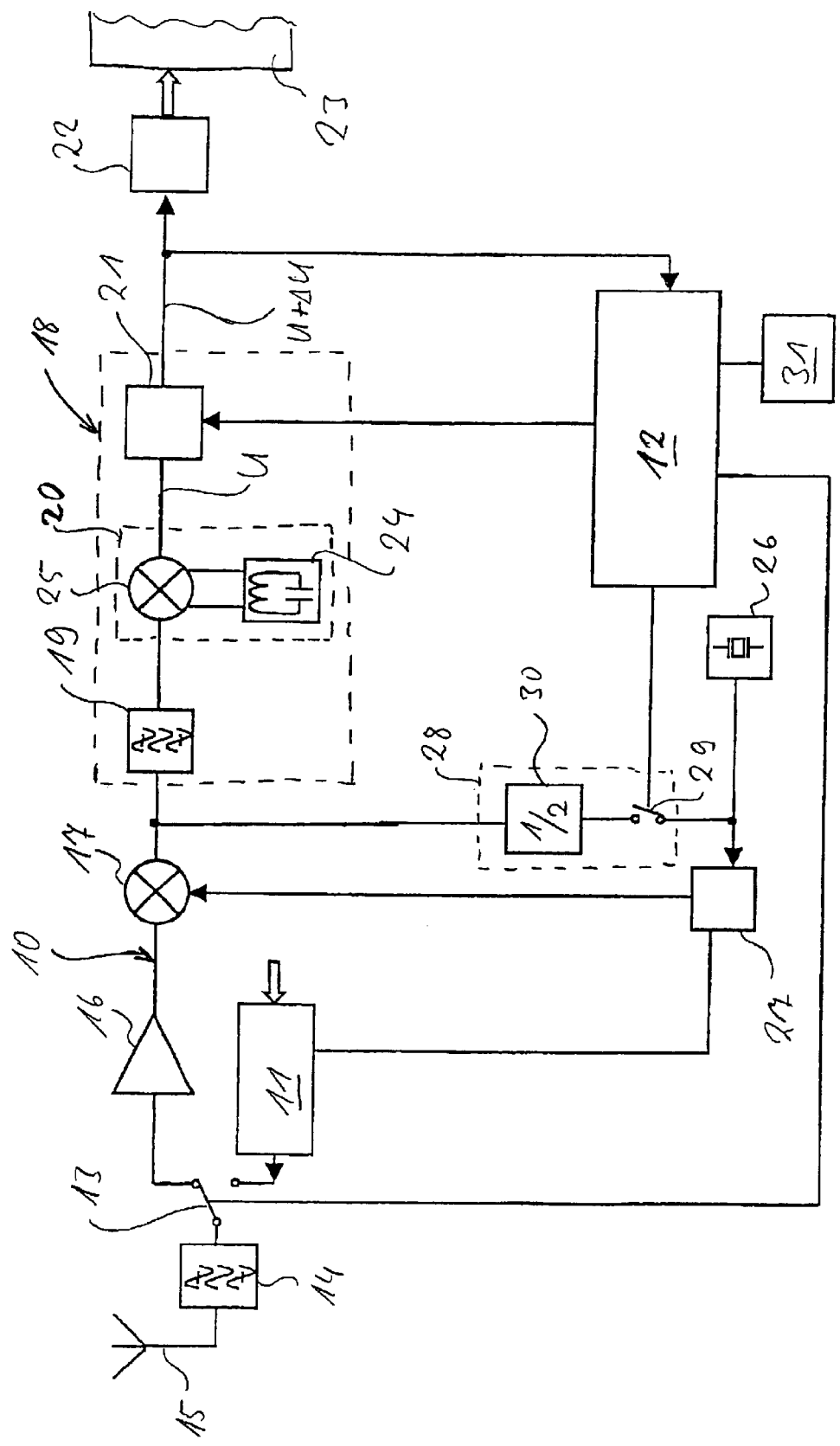
FIG. 1 shows a simplified schematic block diagram of a receiver arrangement according to the invention for receiving frequency-modulated radio signals.
Figure 2:
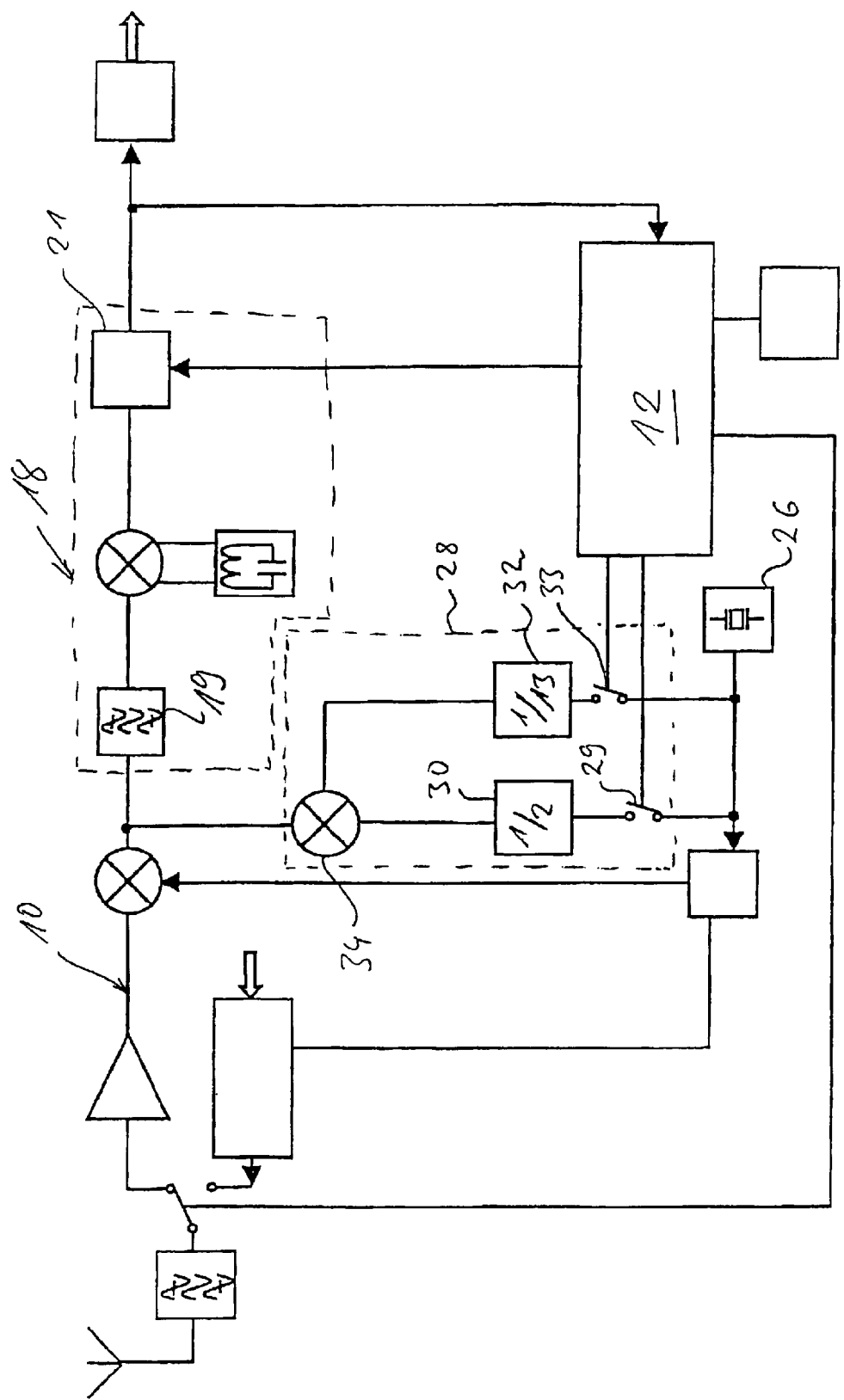
FIG. 2 shows a simplified schematic block diagram of a further receiver arrangement according to the invention.

FIG. 1 shows a transmitter-receiver arrangement with a receiving branch 10 and a transmitting branch 11, the input and output of which are connected via a changeover switch 13, which is controlled by a control circuit arrangement 12, to a terminal of an antenna filter 14, to the other terminal of which a transmitting-receiving antenna 15 is connected.

The receiving branch 10 comprises an input amplifier 16, which amplifies the radio-frequency antenna signal and feeds it to an input of a mixer 17, to the other input of which a frequency signal is applied, the frequency of which is matched to the frequency of the antenna signal in such a way as to generate an intermediate-frequency signal, the frequency of which is the intermediate frequency.

The intermediate-frequency signal supplied by the mixer 17 is applied to a bandpass filter 19, serving as the input stage of a demodulator circuit arrangement 18, the output of which filter is connected to a demodulator circuit 20, which converts the intermediate-frequency signal into a voltage signal, which is applied via an offset stage 21, serving as the output stage of the demodulator circuit arrangement 18, to an A/D converter 22, which serves as the input stage of a signal-processing circuit arrangement 23.

The demodulator circuit 20 comprises an oscillating circuit 24, which is designed for example as a parallel LC oscillating circuit, and an FM discriminator 25, which is connected to the said oscillating circuit and to which the intermediate-frequency signal from the bandpass filter 19 is applied.

To generate the frequency signal for reducing the frequency of the radio-frequency received or antenna signal to the intermediate frequency, a clock-signal oscillator 26 is provided, the clock signal of which is applied to a radio-frequency signal-generation circuit arrangement 27. The frequency signal generated by the radio-frequency signal-generation circuit arrangement 27 is then able to be applied to the mixer 17 and to the transmitting branch 11, depending on the operating mode of the transmitter-receiver arrangement.

In normal receiving operation, following appropriate amplification of the signal in the input amplifier 16, the frequency of the received or antenna signal, for example 2.4 GHz, is reduced in the mixer 17 to the intermediate frequency of 111 MHz, for which purpose the frequency signal of the radio-frequency signal-generation circuit arrangement 27 has a frequency of 2.289 GHz. The intermediate-frequency signal supplied by the mixer 17 is passed via the bandpass filter 19, the central frequency of which corresponds to the intermediate frequency and which has a relatively narrow bandwidth of less than 6 MHz, preferably of less than 3 MHz and, in particular, has a bandwidth of 1.1 MHz. The intermediate-frequency signal allowed through by the bandpass filter 19, which signal contains the frequencies 110.8 MHz and 111.2 MHz on account of the frequency modulation, is set in relation to the intermediate frequency supplied by the oscillating circuit 24, in the FM discriminator 25, in such a way that the demodulator circuit 20 supplies a first voltage $U_-$, which is less than a mean voltage $U_0$, if the frequency of the intermediate-frequency signal is 110.8 MHz, and supplies a second voltage $U_+$, which is greater than the mean voltage $U_0$, if the frequency of the intermediate-frequency signal is 111.2 MHz. The voltage $U_0$ is the mean voltage which is output by the demodulator circuit 20 if the frequency at the input of the demodulator circuit 20 is equal to the frequency supplied by the oscillating circuit 24.

Figure 3A:
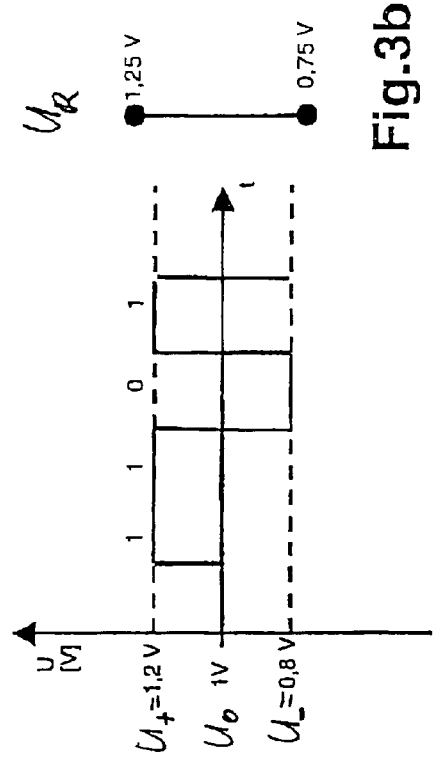
FIG. 3*a* shows a frequency-time diagram to illustrate the intermediate frequency signal.
Figure 3B:
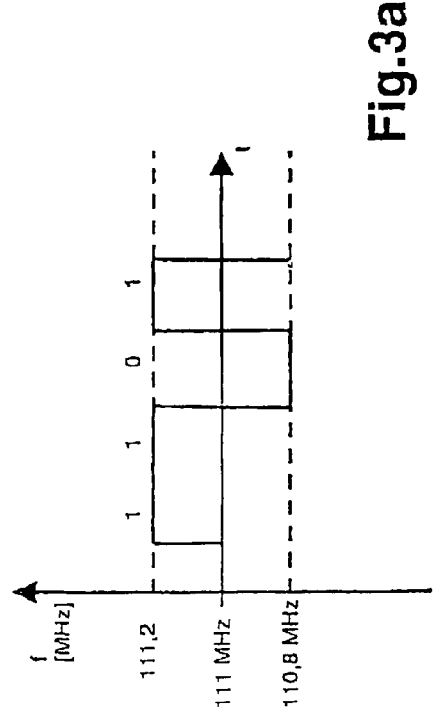
FIG. 3*b* shows a voltage-time diagram to illustrate the voltage signal generated from the intermediate-frequency signal of the demodulator circuit arrangement.

As represented in FIG. 3b, given an ideal oscillating circuit 24, the demodulator circuit 20 supplies for example a voltage $U_+$=1.2 V for an input frequency of 111.2 MHz and a voltage $U_-$=0.8 V for an input frequency of 110.8 MHz. These voltages are adapted to the input voltage range $U_R$ of the A/D converter 22, which in the exemplary embodiment represented lies between 0.75 V and 1.25 V.

If the frequency of the oscillating circuit 24 deviates from the intermediate frequency 111 MHz as a result of temperature influences and/or ageing and is, for example, 110.25 MHz, the output voltage $U_+$ for the higher input frequency becomes 1.95 V, while the output voltage $U_-$ of the demodulator circuit 20 for the lower input frequency is 1.55 V. Consequently, the voltages supplied by the demodulator circuit 20 lie outside the input voltage range $U_R$ of the A/D converter 22, so that the offset circuit arrangement 21 has to be set such that its output voltage (U+_U) is 1.2 V or 0.8 V. In the numerical example represented, _U is thus −0.75 V.

To be able to determine the direct voltage to be added by the offset stage 21 to the output voltage of the demodulator circuit, that is to be able to determine the offset voltage _U, the receiver arrangement according to the invention of the transmitter-receiver arrangement in FIG. 1 has a test-signal generator stage 28, which comprises a switch 29, which can be controlled by the control circuit arrangement 12, and a frequency divider 30. By means of the switch 29, the clock signal from the clock-signal oscillator 26 can be applied to the frequency divider 30, which in the exemplary embodiment represented has the divider factor ½, and which supplies a square-wave signal, which is applied to the input of the bandpass filter 19.

If it is assumed that the frequency of the clock signal is 13 MHz, the frequency of the test signal is 6.5 MHz. Since the test signal is a square-wave signal, it also contains the harmonics. In the present example, the frequency of the 17th harmonic of the square-wave signal with the frequency 6.5 MHz is 110.5 MHz and is consequently close to the intermediate frequency of 111 MHz. Since the square-wave signal of the test-signal generator stage 28 is applied via the narrow-band bandpass filter 19 to the demodulator circuit 20, only the 17th harmonic reaches the demodulator circuit 20. The frequency of the harmonic which has a frequency equal or virtually equal to the intermediate frequency may differ from the intermediate frequency only by such an amount that it is allowed through by the bandpass filter 19. Conversely, the bandpass filter 19 must be such a narrow-band filter that it does not allow the harmonics neighbouring the selected harmonic to pass. Thus, unless other specifications provide that it is in any case to be chosen smaller, the bandwidth of the bandpass filter 19 is expediently chosen to be at least less than the frequency of the test signal, preferably less than half the frequency of the test signal, in particular less than a quarter of the test-signal frequency.

Figure 3C:
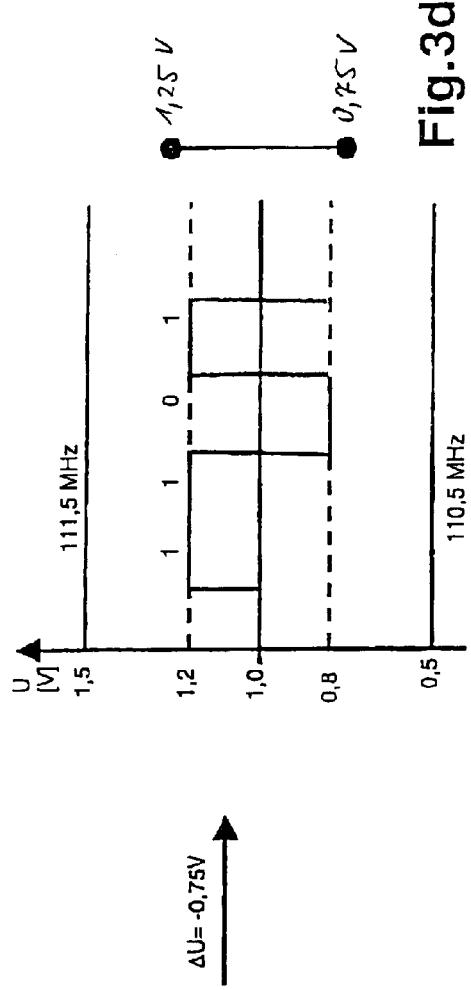
FIGS. 3*c* and 3*d* show diagrams to explain the method of adapting the demodulator circuit arrangement to the input stage of the signal-processing circuit arrangement.

To set the offset voltage _U, the switch 29 is consequently closed by the control circuit arrangement 12, so that a square-wave signal with half the frequency of the clock-signal frequency is applied to the bandpass filter 19 serving as the input stage of the demodulator circuit arrangement 18. The 17th harmonic of the test signal, in the numerical example represented, which has a frequency of 110.5 MHz, is applied to the demodulator circuit 20, which supplies an output signal U=1.25 V, as represented in FIG. 3c, since it is assumed that the frequency of the oscillating circuit 24 is 110.25 MHz. Since, for setting the demodulator circuit arrangement, the offset voltage _U, which is impressed on the output signal U of the demodulator circuit 20 by the offset stage 21, is initially equal to zero, the offset voltage ΔU=−0.75 V can be calculated from the output voltage of the offset stage 21, which is fed to the control circuit arrangement 12, and the expected output voltage, namely U=0.5 V.

In the simplest case, the offset stage 21 is set to _U=–0.75 V and it is checked in the control circuit arrangement 12 whether the output voltage U+_U of the demodulator circuit arrangement 18 corresponds to the expected value. If this is the case, the setting operation is ended.

To be able to use the setting value again during a time period in which no temperature drifts or ageing influences of the oscillating circuit 24 are to be expected, the control circuit arrangement 12 is assigned a memory 31, in which the value for the offset voltage is stored.

If the receiver arrangement is operating as an element of a telecommunications system in burst mode, the setting of the demodulator circuit arrangement 18 can be carried out in the described way before the arrival of each burst. However, during a receiving period, the setting of the demodulator circuit arrangement 18 is expediently performed in the described way only before the first burst, while subsequently the respective renewed setting takes place with the aid of the value for the offset voltage _U stored in the memory 31, since virtually no changes of the oscillating circuit frequency as a result of temperature fluctuations or ageing effects occur during a relatively short receiving period.

In a preferred development of the invention, the test-signal generator stage has in addition to the first ½ frequency divider 30 a second ⅟₁₃ frequency divider 32, which is able to be connected via a switch 33 to the clock-signal output of the clock-signal oscillator 26. The output signals of the two frequency dividers are combined with one another in a mixer 34, so that the test signal on the basis of a clock-signal oscillator frequency of 13 MHz contains in addition to the 7.5 MHz square-wave component a signal component with 111.5 MHz, obtained by combining the 17th harmonic of the output signal of the ½ frequency divider 30 with the 1 MHz output signal of the ⅟₁₃ frequency divider 32. From the frequency composition applied to the input of the demodulator circuit arrangement 18, only the signal component with 111.5 MHz is allowed through by the bandpass filter 19 as the actual test signal, this component leading to the output voltage U=2.25 V of the demodulator circuit 20 if the same frequencies as in the exemplary embodiment described with reference to FIG. 1 are presupposed. Since, instead of the output voltage U=2.25 V for a frequency of 111.5 MHz, an output voltage of 1.5 V is expected, the offset voltage _U=–0.75 V can also be determined from the output frequency determined in this way, as represented in FIG. 3c. However, it is preferably provided that, when setting the demodulator circuit arrangement 18, initially only switch 29 is closed by the control circuit arrangement 12, so that a measuring mode as described above is carried out.

Figure 3D:
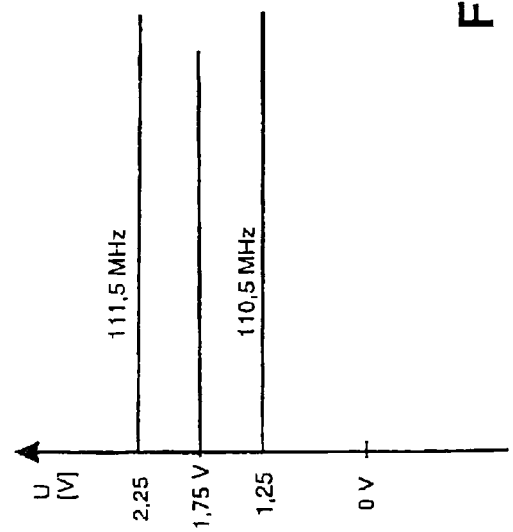

Once the output voltage 1.25 V has been determined for the first test-signal frequency of 110.5 MHz, the switch 33 is thus closed by the control circuit arrangement 12, in order to carry out the second measuring operation, which, as already mentioned, supplies the output voltage 2.25 V for the test frequency 115 MHz. The voltage 1.75 V, which corresponds to the intermediate frequency 111 MHz, can then be determined by averaging. Since this average value in turn deviates by +0.75 V from the expected output voltage 1 V for the intermediate frequency, the offset voltage _U=–0.75 V can also be determined from this. By setting the offset voltage of the offset stage 21, the output voltage of the demodulator circuit arrangement 18 is adapted to the input voltage range of the A/D converter 22, as shown in FIG. 3d.

In this way, the accuracy of the determination of the required offset voltage can be increased, so that a better and more accurate setting of the demodulator circuit arrangement 18 is achieved.

The circuit arrangement according to the invention is also suitable for carrying out a self-testing method, in which the receiving branch 10 or the part of the receiving branch following on from the mixer 17 for reducing the input frequency to the intermediate frequency, can be tested. For this purpose, as when setting the demodulator circuit arrangement 18, a square-wave signal which has a harmonic with a frequency close to the intermediate frequency is formed from the clock signal supplied by the clock-signal oscillator 26. This test signal is applied in the way described above to the demodulator circuit arrangement 18 and brings about an output signal, which is fed to the control circuit arrangement 12, which on account of the output signal supplies a test-result signal indicating serviceability, which can be output via a corresponding display device of the transmitter-receiver arrangement.

For self-testing, it is also possible, however, that after establishing the serviceability of the demodulator circuit arrangement 18 the offset circuit 21 is set such that the output signal of the demodulator circuit arrangement 18, which is brought about by the test signal, falls within the input voltage range of the input stage of the signal-processing circuit arrangement, so that the A/D converter and further elements of the circuit arrangement in the signal processing stage can also be checked for their serviceability. In this case, the test-result signal indicating serviceability is generated in the signal-processing circuit arrangement.

What is claim is:

1. Receiver arrangement for receiving frequency-modulated radio signals, having
    a demodulator circuit arrangement (18), which converts an intermediate-frequency signal into a voltage signal, which is applied to an input stage (22) of a signal-processing circuit arrangement (23),
    a clock-signal oscillator (26), which supplies a clock signal for the clock control of elements of the circuit arrangement,
    a test-signal generator stage (28), the input of which is connected to an output of the clock-signal oscillator (26) supplying the clock signal and the output of which is connected to an input stage (19) of the demodulator circuit arrangement (18), and
    a control circuit arrangement (12) for setting and/or testing the demodulator circuit arrangement (18), which controls the test-signal generator stage (28) for carrying out setting or testing operation and, during the setting or testing operation, sets the demodulator circuit arrangement (18) on the basis of its output signal or supplies a test-result signal indicating serviceability.

2. Receiver arrangement according to claim 1, characterized in that the test-signal generator stage (28) is connected to the clock-signal oscillator (26), the clock signal of which serves for generating a frequency signal for reducing the frequency of a received signal to the intermediate frequency.

3. Receiver arrangement according to claim 1, characterized in that the test-signal generator stage (28) comprises a frequency divider (30), which supplies as the output signal a frequency signal which contains a harmonic with a first frequency equal or virtually equal to the intermediate frequency.

4. Receiver arrangement according to claim 3, characterized in that the test-signal generator stage (28) has a further frequency divider (32), the frequency divider ratio of which is different from that of the first frequency divider (30) and the output signal of which is applied to a mixer (34), to which the output signal of the first frequency divider (30) is also fed in order to obtain a test signal which contains a different harmonic with a second frequency close to the intermediate frequency.

5. Receiver arrangement according to claim 3, characterized in that the clock signal output of the clock-signal oscillator (26) is applied to the frequency dividers (30, 32) via in each case one of the switches (29, 33) which can be controlled by the control circuit arrangement.

6. Receiver arrangement according to claim 1, characterized in that the demodulator circuit arrangement (18) has as the input stage a bandpass filter (19), and in that the fundamental frequency of the test signal is greater than the bandwidth of the bandpass filter (19), preferably greater than twice the bandwidth, in particular greater than four times the bandwidth of the bandpass filter (19).

7. Receiver arrangement according to claim 1, characterized in that the demodulator circuit arrangement (18) has as the output stage, an offset stage (21), which is connected to a voltage signal output of a demodulator circuit (20) of the demodulator circuit arrangement (18) in order to adapt the output signal of the demodulator circuit arrangement (18) to the input stage (22) of the signal-processing circuit arrangement (23).

8. Receiver arrangement according to claim 7, characterized in that the offset stage (21) adds a direct voltage component to the voltage signal supplied by the demodulator circuit (20).

9. Receiver arrangement according to claim 7, characterized in that the offset stage (21) is set by the control circuit arrangement (12) during setting operation on the basis of its output signal.

10. Receiver arrangement according to claim 7, characterized in that the control circuit arrangement (12) is assigned a memory (31) in which a value for a direct voltage offset to be set, determined during the setting operation on the basis of the output signal of the offset stage (21), is stored, and in that the offset stage (21) can be set by the control circuit arrangement (12) to correspond to the stored value.

11. Method of adapting a receiving branch of a receiver arrangement, which comprises a demodulator circuit arrangement (18) converting an intermediate-frequency signal into a voltage signal, to an input stage (22) of a signal-processing circuit arrangement (23), in which a test signal with a known frequency is formed from a clock signal supplied by the clock-signal oscillator (26) and is applied to an input of the demodulator circuit arrangement (18), the demodulator circuit arrangement (18) is set on the basis of its output signal to adapt its output signal to the input stage (22) of the signal-processing circuit arrangement (23), wherein the test signal is formed from the clock signal supplied by the clock-signal oscillator (26) by frequency division with wave shaping, so that the test signal contains a harmonic with a first frequency equal or virtually equal to the intermediate frequency, and the harmonic with the first frequency is fed to a demodulator circuit (20) of the demodulator circuit arrangement (18) via a filter, preferably via a bandpass filter (19).

12. Method according to claim 11, characterized in that a second test signal is generated by mixing the first test signal with a signal formed from the clock signal supplied by the clock-signal oscillator (26) by frequency division by a different divider factor, the frequency of which signal is equal or virtually equal to twice the difference between the frequency of the harmonic with the first frequency and the intermediate frequency, so that the second test signal contains a harmonic with a second frequency virtually equal to the intermediate frequency.

13. Method according to claim 12, characterized in that the first test signal and the second test signal are applied one after the other to the demodulator circuit arrangement (18), in order to determine a direct voltage offset for the adaptation of the output signal of the demodulator circuit arrangement (18) to the input stage (22) of the signal-processing arrangement (23).

14. Self-testing method for testing a receiving branch of a receiver arrangement with a clock-signal generator, which has a demodulator circuit arrangement (18) converting an intermediate-frequency signal, in which a test signal with a known frequency is formed from a clock signal supplied by the clock-signal oscillator (26) by frequency division with square-wave shaping, so that the test signal contains a harmonic with a first frequency equal or virtually equal to the intermediate frequency is applied to an input of the demodulator circuit arrangement (18), and a test-result signal indicating the serviceability of the receiving branch (10) is generated on the basis of the output signal of the said receiving branch.

* * * * *